United States Patent
Kobayashi et al.

(10) Patent No.: US 7,382,966 B2
(45) Date of Patent: Jun. 3, 2008

(54) APPARATUS AND METHOD FOR RECORDING/REPRODUCING OPERATION INFORMATION IN ASSOCIATION WITH VIDEO OR MUSIC

(75) Inventors: Hironari Kobayashi, Hamamatsu (JP); Daisuke Takahashi, Hamamatsu (JP); Makoto Hiroi, Hamamatsu (JP)

(73) Assignee: Yamaha Corporation, Hamamatsu-Shi (JP)

( * ) Notice: Subject to any disclaimer, the term of this patent is extended or adjusted under 35 U.S.C. 154(b) by 990 days.

(21) Appl. No.: 10/621,024

(22) Filed: Jul. 16, 2003

(65) Prior Publication Data

US 2004/0017998 A1 Jan. 29, 2004

(30) Foreign Application Priority Data

Jul. 16, 2002 (JP) ............................ 2002-206777

(51) Int. Cl.
*H04N 5/91* (2006.01)
*H04N 5/95* (2006.01)
(52) U.S. Cl. .......................................... 386/65; 386/85
(58) Field of Classification Search .................. 386/4, 386/52, 60, 62, 65, 48, 61, 85; 348/441
See application file for complete search history.

(56) References Cited

U.S. PATENT DOCUMENTS

| 5,615,189 A | 3/1997 | Kuribayashi |
| 5,956,090 A * | 9/1999 | Yamauchi .................. 348/441 |
| 2001/0041049 A1* | 11/2001 | Kanda ......................... 386/52 |

* cited by examiner

Primary Examiner—Thai Q. Tran
Assistant Examiner—Tat Chi Chio
(74) Attorney, Agent, or Firm—Morrison & Foerster LLP (57) ABSTRACT

Timer generates a first time code with a relatively high resolution. Second time code, given from a reproduction device in relation to video or music reproduced by the reproduction device, has a resolution lower than the first time code. By correcting the timer-generated first time code on the basis of the second time code, there can be generated a corrected first time code having a same over-time progression as the second time code but having a higher resolution than the second time code. Once an operator, such as a mixer, is operated at given reproduction timing of the video or music during recording, data indicative of the operation is stored in a memory along with the first time code corrected in accordance with the second time code. In reproduction, the memory is read in accordance with the first time code, corrected on the basis of the second time code.

17 Claims, 7 Drawing Sheets

APPARATUS AND METHOD FOR RECORDING/REPRODUCING OPERATION INFORMATION IN ASSOCIATION WITH VIDEO OR MUSIC

BACKGROUND OF THE INVENTION

The present invention relates generally to operation information recording/reproducing apparatus and methods suited for use in digital mixing consoles etc., as well as time code generating apparatus and methods pertaining to the operation information recording/reproducing apparatus and methods.

Generally, the digital mixing consoles known today include a user-operable operation panel having an electromotive fader unit, a DSP (Digital Signal Processor) for processing audio signals, and a CPU for detecting operational states of the operation panel and establishing algorithms for the DSP on the basis of the detected operational states. Among the known digital mixing consoles is one having a so-called "automix" function. The automix function is intended to automatically set fader operation amounts, equalizing amounts, etc., in accordance with the passage of time, in synchronism with external equipment, such as a video tape recorder, digital tape recorder or MIDI sequencer.

Recording processing by the automix function is carried out as follows. First, a time code is supplied, along with information of video, audio and/or the like, from external equipment to the mixing console. As the user manipulates or operates the electromotive fader unit or the like, event data are sequentially recorded in a memory or the like. The event data to be recorded here include operation data indicative of the contents of the user's operation and "time stamps" corresponding to values of the time code at the time of the user operation.

These various event data will be generically called "automix data". In reproduction, a time code is supplied again, along with information of video, audio and/or the like, from the external equipment to the mixing console, as in the recording. In the mixing console, the corresponding event data, included in the auto mix data, are read out in accordance with a progression of the supplied time code, and the electromotive fader unit etc. are automatically driven in accordance with the operation data included in the event data.

Conventionally, any desired type of the time code supplied from the external equipment is variably selectable from several types, such as "30", "30drop", "25" and "24", classified according to the resolution per second. These values are predetermined in accordance with the frame frequencies in various image recording methods. The time code of resolution "30" is based on the frame frequency of "29.97" Hz in the NTSC system; namely, the frame frequency "29.97" Hz is rounded off to the integral value "30". The time code of resolution "30drop" is intended to cause a broadcasting time to coincide with that of the frame frequency "29.97" Hz, by periodically inserting a value of the "second" of resolution "29" in resolution "30". Further, the time code of resolution "25" represents the frame frequency of the PAL system, and the time code of resolution "24" represents the frame frequency of movie films.

However, in cases where event data are recorded with a time code of a given resolution, the conventional mixing console could not reproduce the recorded event data using a time code of a resolution different from the given resolution. Thus, if the recorded format of images is changed using, for example, a "telecine" converter, the automix data recorded before the change of the recorded format could not be used by the conventional mixing console.

SUMMARY OF THE INVENTION

In view of the foregoing, it is an object of the present invention to provide an operation information recording/reproducing apparatus and method and a time code generating apparatus and method which can appropriately deal with a change in a type of time code used.

In order to accomplish the above-mentioned object, the present invention provides an apparatus for recording operation information in association with video or music reproduced by a reproduction device, which comprises: a timer that generates a first time code; an operator section that includes one or more operators and that is arranged to generate operation data by detecting an operational state of each of the operators; a storage section; a control section that causes the storage section to store the operation data of each of the operators, generated by the operator section, along with the first time code generated by the timer; a reception section that receives a second time code given by the reproduction device, in relation to the video or music reproduced by the reproduction device, the second time code being of lower resolution than the first time code; and a time code correction section that corrects the first time code, generated by the timer, on the basis of the second time code received by the reception section.

The present invention also provides an apparatus for reproducing operation information in association with video or music reproduced by a reproduction device, which further comprises: a timer that generates a first time code; a storage section that stores operation data, indicative of an operational state to be taken by at least one operator, along with time information indicative of a reproducing time when the operation data is to be reproduced; a control section that reads out, from the storage section, the operation data for which the reproducing time has arrived, in accordance with a progression of the first time code generated by the timer; a reception section that receives a second time code given by the reproduction device, in relation to the video or music reproduced by the reproduction device, the second time code being of lower resolution than the first time code; and a time code correction section that corrects the first time code, generated by the timer, on the basis of the second time code received by the reception section, to thereby provide a corrected first time code. In this invention, the control section reads out, from the storage section, each operation data for which the reproducing time has arrived, in accordance with a progression of the corrected first time code so that the operation data is reproduced from the storage section in association with the video or music reproduced by the reproduction device. As an example, the reproducing apparatus further comprises an operator section including one or more operators, an operational state of each of the operators being capable of being automatically set. Once given operation data is read out from the storage section by the control section, a corresponding one of the operators in the operator section is automatically set to an operational state in accordance with the read-out operation data.

In recording of operation information, for example, once the user has manipulated or operated a given operator in association with reproducing timing of video or music reproduced by the reproduction device, operation data indicative of the user's operation is stored in the storage section along with the reproducing timing. In subsequent reproduction of operation information, when given reproducing timing of the video or music reproduced by the reproduction device has arrived, the operation data with the time data corresponding to the given reproducing timing is read out from the storage section. In this way, the operational state corresponding to the read-out operation data can be reproduced in association with the reproducing timing of the video or music reproduced by the reproduction device. One important feature of the present invention is that the value of the first time code generated by the timer is corrected on the basis of a time code (second time code) given from the reproduction device in accordance with reproduction of the video or music, instead of the second time code being directly recorded in the storage section, and the thus-corrected first time code is recorded in the storage section along with the operation data. Thus, even where the time code (second time code) given from the reproduction device variously varies in its time resolution, the time resolution of the first time code to be stored in the storage section can be universalized because it is set by the performance of the timer. As a result, the present invention can provide solutions to the various deficiencies encountered by the conventional techniques.

As an example, the time code correction section is capable of correcting the first time code in correspondence with a plurality of types of second time code of different resolution, and the resolution of the first time code is a common multiple of the respective resolution of the plurality of types of second time code. With the resolution of the first time code that is a common multiple of the respective resolution of the plurality of types of second time code, it is possible to significantly simplify arithmetic operations for the time code correction. As an example, the time code correction section converts a value of the second time code into a value having the resolution of the first time code, in accordance with a ratio between the resolution of the first time code and the resolution of the second time code, and then sets the converted value in the timer as the first time code.

As an example, the apparatus of the invention further comprises: a designation section that designates a type of second time code to be received by the reception section, from among a plurality of types of second time code of different resolution; a retention section that retains a second time code of the type, designated by the designation section, as a current time code; an updating section that converts the first time code, generated by the timer, into a second time code having the resolution of the designated type in accordance with the designated type and updating the current time code, retained by the retention section, with the second time code having the resolution of the designated type; and a display section that displays the current time code retained by the retention section. Such arrangements allow the first time code to be stored in the storage section while allowing the second time code, directly indicating the reproducing timing, in the reproduction device, of the video or music, to be visually displayed.

According to another aspect of the present invention, there is provided a time code generating apparatus, which comprises: a timer section that generates a first time code in accordance with passage of time; a designation section that designates a type of time code from among a plurality of types of time code of different resolution; a retention section that retains, as a current time code, a time code varying over time with a resolution of the type designated by the designation section; and an updating section that converts the first time code, generated by the timer, into a second time code having the resolution of the designated type in accordance with the designated type and updating the current time code, retained by the retention section, with the second time code having the resolution of the designated type. In this apparatus, the current time code retained by the retention section is outputted.

As an example, the time resolution of the first time code is a common multiple of respective time resolution of the plurality of types of time code.

The present invention may be constructed and implemented not only as the apparatus invention as discussed above but also as a method invention. Also, the present invention may be arranged and implemented as a software program for execution by a processor such as a computer or DSP, as well as a storage medium storing such a software program. Further, the processor used in the present invention may comprise a dedicated processor with dedicated logic built in hardware, not to mention a computer or other general-purpose type processor capable of running a desired software program.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

For better understanding of the object and other features of the present invention, its preferred embodiments will be described hereinbelow in greater detail with reference to the accompanying drawings, in which.

DETAILED DESCRIPTION OF EMBODIMENTS

Figure 1:
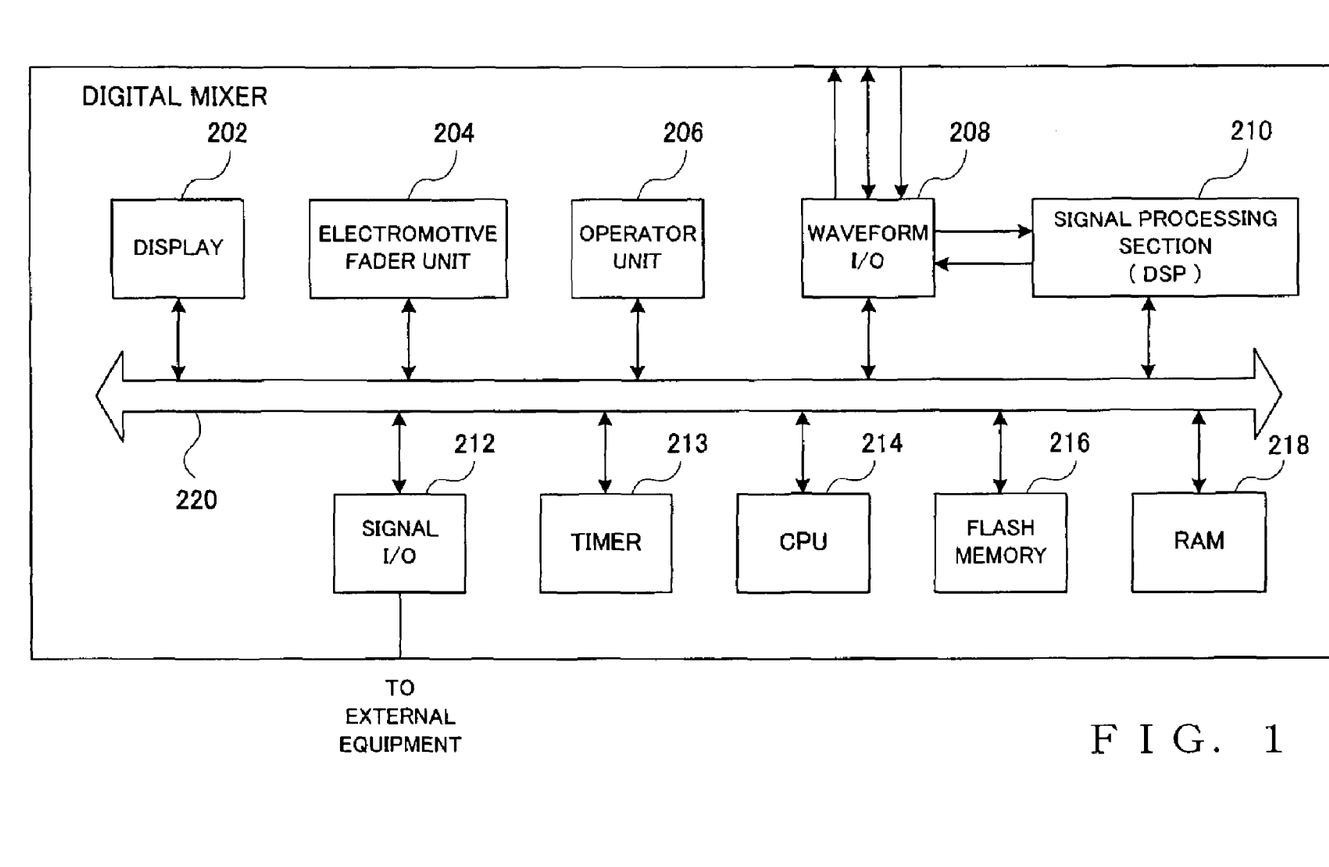
FIG. 1 is a block diagram showing an exemplary general setup of a mixing console in accordance with an embodiment of the present invention.

1. Setup of Embodiment 1.1 General Setup:

FIG. 1 is a block diagram showing a general setup of a mixing console in accordance with an embodiment of the present invention. The mixing console includes a display 202, which displays various information to the user on the basis of display information supplied via a bus 220. The mixing console also includes an electromotive fader unit 204, which, when operated by the user, outputs its operated position via the bus 220 and is driven in accordance with setting information supplied via the bus 220 so that a fader position is automatically set. Further, in the mixing console, reference numeral 206 represents an operator unit, which includes volume operators for setting tone color parameters, such as filter characteristics, monitoring position, contents to be displayed on the display 202, etc. These operators of the operator unit 206 too can be driven electrically so that their operated positions can be automatically set on the basis of setting information.

Reference numeral 208 represents a waveform I/O section, which inputs and outputs analog or digital audio signals to and from the mixing console. In the instant embodiment, mixing processing, effect processing, etc. of various audio signals are all performed in a digital manner. However, many of audio signals to be input and output from and to outside the mixing console are analog signals. Therefore, a plurality of cards having various functions, such as microphone level analog input, line level analog input, digital input, analog output and digital output functions, are inserted in the waveform I/O section 208 as may be necessary, so that any necessary conversion processes can be carried out by these inserted cards.

Reference numeral 210 represents a signal processing section, which comprises a group of DSPs (Digital Signal Processors). The signal processing section 210 performs mixing processing and effect processing on digital audio signals supplied via the waveform I/O section 208, and then sends the processed results back to the waveform I/O section 208. Signal I/O section 212 inputs and outputs a time code and other information from and to any of various external equipment. Here, the time code supplied from the external equipment will be referred to as an "external time code". Timer 213 counts the current time, and, on the basis of the counted current time, it generates a time code to be used only within the mixing console; such a time code generated by the timer 213 will be referred to as an "internal time code". The mixing console also includes a CPU 214, which controls various components of the mixing console via the bus 220 on the basis of control programs as will be later described. 216 represents a flash memory, which stores the control programs, setting information of the mixing console, etc. 218 represents a RAM that is used as a working memory of the CPU 214.

Detailed structure of the signal I/O section 212 will be described with reference to FIG. 3. As shown, the signal I/O section 212 includes an SMPTE terminal 2 for receiving an SMPTE time code from video equipment or the like, and an MTC terminal 3 for receiving an MTC (MIDI Time Code) signal that is created by converting the SMPTE time code into the MIDI format. Note that the MTC terminal 3 has a same shape as an MIDI signal input/output terminal and a MIDI cable connected to the MTC terminal 3 is one dedicated to the MTC signal.

Figure 3:
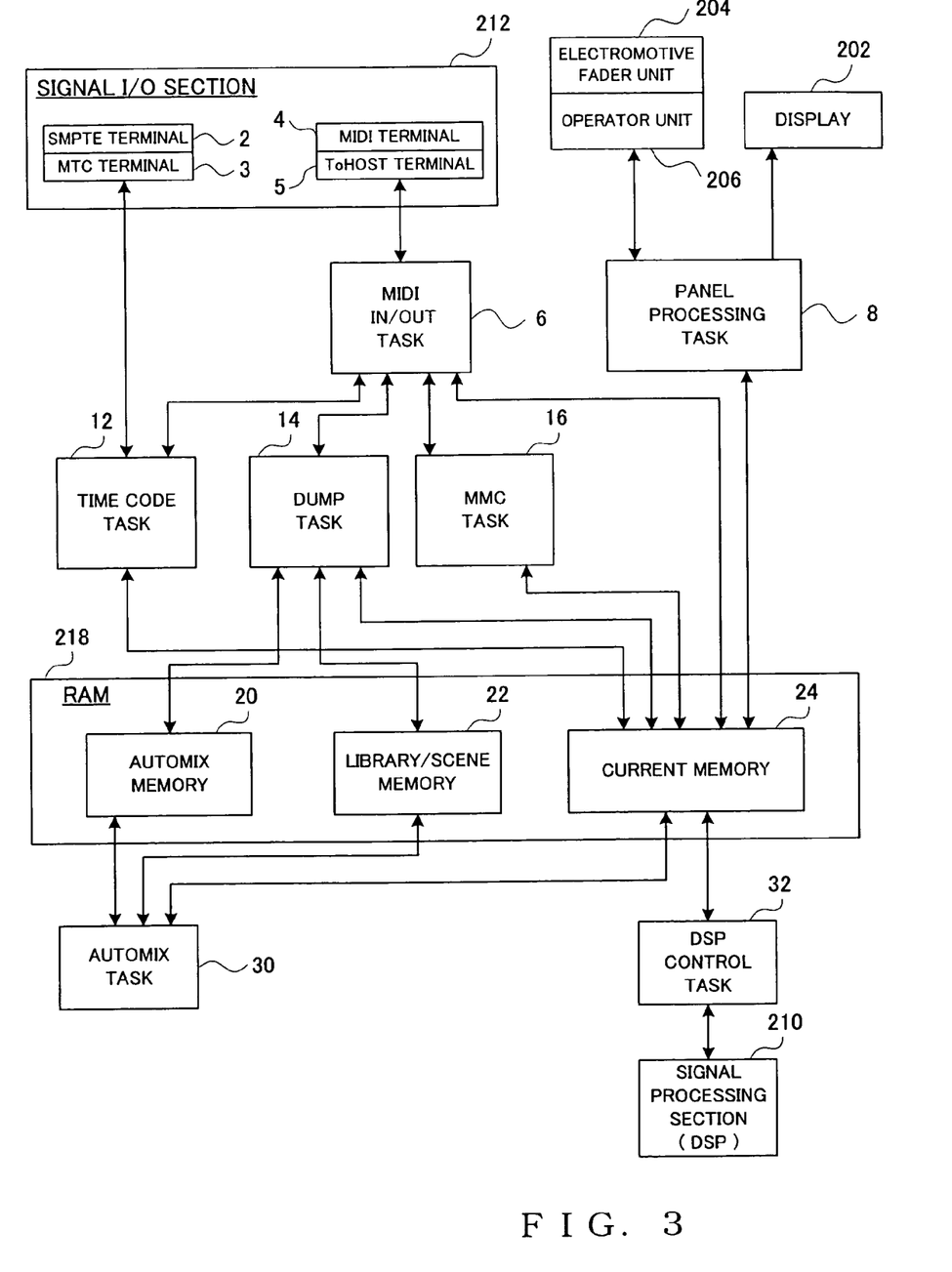
FIG. 3 is a block diagram showing various tasks performed by a CPU in the embodiment of FIG. 1.

Further, in FIG. 3, reference numeral 4 represents a MIDI terminal for inputting and outputting a MIDI signal from and to MIDI equipment such as a sequencer. Reference numeral 5 represents a "ToHOST" terminal, which is mainly connected to a serial port of a personal computer to input and output an MIDI signal from and to the serial port. MIDI signals supplied via the MIDI terminal 4 or ToHOST terminal 5 may include MTC signals.

1.2. Algorithmic Construction in the Signal Processing Section 210 etc.:

Next, algorithms implemented in the signal processing section 210 etc. will be described with reference to FIG. 2. In the figure, reference numerals 101-106 and 142-144 represent a plurality of cards inserted in the waveform I/O section 208. First, 102 represents a microphone level analog input card, which, upon receipt of a microphone level analog audio signal, converts the received analog audio signal into a digital audio signal and sends the converted signal to the signal processing signal 210. 104 represents a stereo analog input card, which, upon receipt of line level analog audio signals of two channels, converts the received analog audio signals into digital audio signals and sends the converted signals to the signal processing signal 210. Further, 106 represents a stereo digital input card, which, upon receipt of stereo digital audio signals, converts the received signals into an internal format of the signal processing signal 210.

Further, reference numeral 142 represents an analog output card, which converts a digital audio signal, supplied from the signal processing signal 210, into an analog audio signal and outputs the thus converted signal. 143 represents a stereo analog output card, which converts digital audio signals of two channels, supplied from the signal processing signal 210, into analog audio signals of two channels (stereo analog audio signals) and outputs the thus-converted converted signals. 144 represents a digital output card, which converts a digital audio signal of the internal format, supplied from the signal processing signal 210, into a digital audio signal of a predetermined format, such as AES/EBU, ADAT or TASCAM, and outputs the thus-converted digital signal.

Whereas the above-mentioned functions are implemented, in the instant embodiment, by the waveform I/O section 208 and the various cards that are separate hardware components from the signal processing signal 210, other functions than the above-mentioned are implemented by programs executed in the signal processing signal 210. Reference numeral 114 represents an input channel adjustment section, which performs adjustment of tone volume, tone quality, etc. for up to 96 input channels on the basis of user's operation of the electromotive fader unit 204 and operator unit 206. Input patch section 112 assigns digital audio signals, supplied from any of the input cards 102, 104, 106, etc., to given channels of the input channel adjustment section 114.

Figure 2:
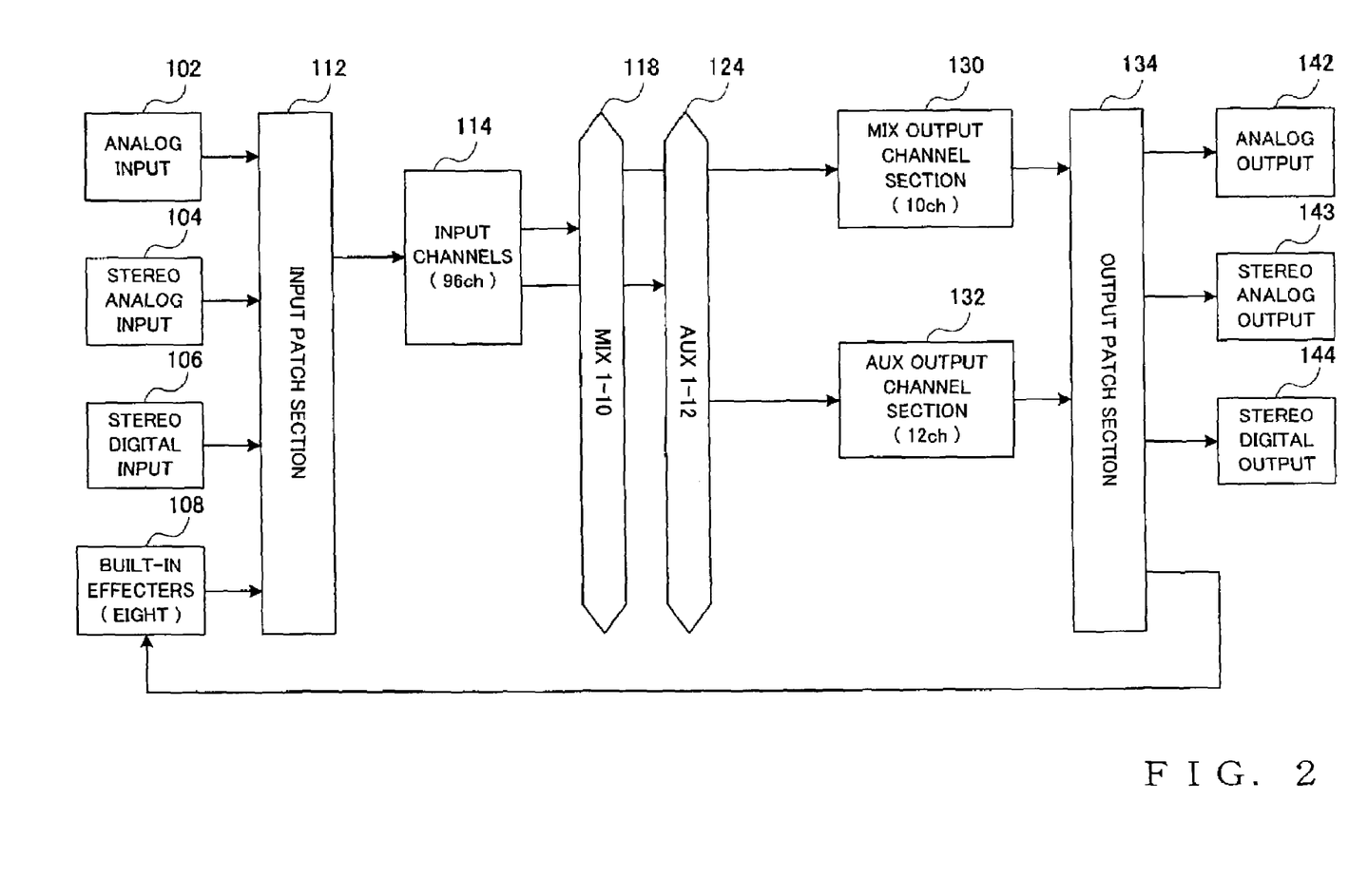
FIG. 2 is a block diagram showing algorithms executed by a signal processing section etc. in the embodiment of FIG. 1.

Further, in FIG. 2, reference numeral 118 represents a "10-channel" mixing (MIX) bus unit, which mixes faded (post-fade) digital audio signals on a channel-by-channel basis. For each of the input channels, setting can be made as to whether the audio signal of the channel in question is to be supplied to the MIX bus unit 118. MIX output channel section 130 performs level control, channel by channel, on mixed results MIX1-MIX10 of the individual channels from the 10-channel" mixing bus unit 118 and outputs the thus level-controlled mixed signals. Further, the individual input channels can be subjected to 12-channel tone volume adjustment separately from the tone volume control by the electromotive fader unit 204, and the results of such tone volume adjustment are supplied via a 12-channel AUX bus unit 124 to an AUX output section 132.

Then, the mixed results from the Mix output channel section 130 and AUX output section 132 are supplied to an output patch section 134. In the output patch section 134, the digital audio signals output from the Mix output channel section 130 and AUX output section 132 are assigned to given locations of the output cards 142, 143 and 144. Reference numeral 108 represents an internal (built-in) effecter, which performs effect processing on up to eight output channels, and feeds the results of the effect processing back to the input channel adjustment section 114 via the input patch section 112.

1.3. Task Setup in the CPU 214:

Next, an example setup of tasks to be performed in the CPU 214 will be described, with reference to FIG. 3.

First, for the automix function, an automix region 20, library/scene region 22 and current region 24 are secured in the RAM 218. In the automix region 20, automix data are stored. As stated above, the terms "automix data" generically refer to various event data corresponding to user's operation of the electromotive fader unit 204, operator unit 206, etc. Each of the event data includes operation data and a time stamp.

In the current region 24, there are stored current operational states of the mixing console, such as operated positions of the electromotive fader unit 204, operator unit 207, etc. Information written from each task into the current region 24 is also reflected in other tasks, so that contents of signal processing by the signal processing section 210 etc. too are determined. Further, the library/scene region 22 is capable of storing a plurality of sets of the contents stored in the current region 24. For example, by storing, in the library/scene region 22, given contents stored in the current region 24 at a given time point, it is possible to reproduce (recall) settings at that time point through one touch of a predetermined operator.

In FIG. 3, reference numeral 6 represents a MIDI I/O task, which receives MIDI data received via the MIDI terminal 4 or ToHOST terminal 5. Various types of MIDI data pertain to behavior of the mixing console. In the MIDI I/O task 6, the following operations are carried out in accordance with the types of the MIDI data.

(1) Control Command to the Mixing Console:

The electromotive fader unit 204 and operator unit 206 of the mixing control can be controlled in accordance with MIDI signals supplied from the external equipment. Specifically, contents of operation performed are supplied as a "control change" included in the MIDI signals. When such data has been supplied, the corresponding data stored in the current region 24 is rewritten directly by the MIDI I/O task 6.

(2) Control Command to External Recorder:

In MIDI signals, commands, such as a start, stop and locate commands, can be included in order to control an external recording device, such as a tape recorder. Such commands are generically called MMC (MIDI Machine Control). When such an MMC has been supplied, the contents of the supplied MMC are transferred to the MMC task 16.

(3) Bulk-dumped Data:

In some cases, the data mentioned in items (1) and (2) above are supplied after being bulk-dumped into binary codes, and the automix data are supplied from an external source after being bulk-damped. When such bulk-dumped command data are supplied, the contents of the data are transferred to a dump task 14.

(4) MIDI Time Code:

As noted above, the supplied MIDI signals may include an MTC signal. When such an MTC signal has been supplied, the contents of the signal are transferred to a time code task 12.

Further, in FIG. 3, reference numeral 8 represents a panel processing task, which, when the electromotive fader unit 204 or operator unit 206 has been operated by the user, causes the contents of the user operation to be reflected in the current region 24. Once the contents stored in the current region 24 are updated by another task, the electromotive fader unit 204 or operator unit 206 is driven by the panel processing task 8 on the basis of the updated contents.

Further, because contents to be displayed on the display 202 are also stored in the current region 24, the contents can be read out by the panel processing task 8 and reflected on the display 202.

In the time code task 12, an external time code is received directly from the SMPTE terminal 2 or MTC terminal 3, or an external time code is received indirectly from the MIDI terminal 4 or ToHOST terminal 5 via the MIDI I/O task 6. On the basis of the received external time code, the current time counted by the timer 213 is set or corrected, and an internal time code representing the current time is written into the current region 24. In the dump task 14, dump data supplied via the MIDI I/O task 6 is transferred to the current region 24, library/scene region 22 or automix region 20. Further, data is transferred, by the dump task 14, between the regions 20, 22 and 24. When an MMC signal has been supplied to the MMC task 16 via the MIDI I/O task 6, the stored contents of the current region 24 are updated on the basis of the supplied MMC signal.

Reference numeral 30 represents an automix task, which performs recording and reproducing processing on the automix region 20. Namely, when automix data are to be recorded, the automix task reads out the stored contents of the current region 24 periodically, and writes information to be recorded into the automix region 20. When automix data are to be reproduced, on the other hand, the automix task sequentially reads out event data stored in the automix region 20 and updates the corresponding data in the current region 24. 32 represents a DSP control task, which updates arithmetic processing algorithms and parameters of the individual DSPs in the signal processing section 210 on the basis of the data currently written in the current region 24.

2. Behavior of the Embodiment

2.1. Recording Processing:
2.1.1. Start of Recording Processing:

Now, behavior of the embodiment of the mixing console will be described. First, a description will be made about processing for recording automix data into the automix region 20, with reference to FIGS. 4 and 5.

Figure 4:
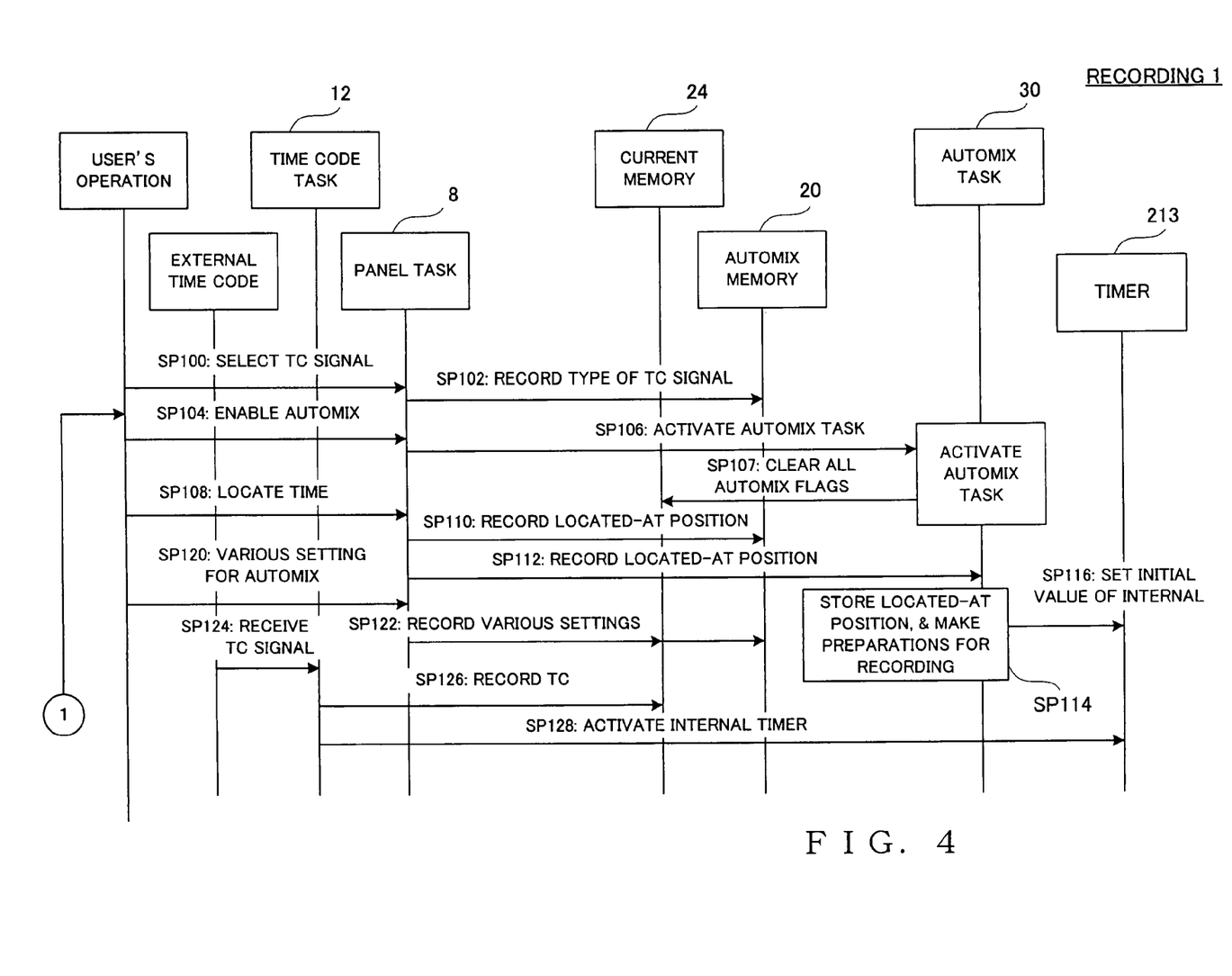
FIG. 4 is a flow chart showing a first portion of recording processing performed in the embodiment of FIG. 1.

First, in the illustrated example of FIG. 4, the user selects a desired type of external time code (external "TC" signal) from among various types, such as "30", "30drop", "25" and "24", via the operator unit 206 of the mixing console, at step SP100. The thus-selected type of external time code is written, at step SP102, to a predetermined location within the automix region 20. Note that, instead of the user selecting a desired type of external time code, the mixing console may identify the type of a time code supplied from the external equipment, to thereby automatically select a type of time code.

Then, once the user enables the automix function via the operator unit 206 at step SP104, the panel processing task 8 performs an operation to activates the automix task 30 at step SP106. Once the automix task 30 is activated, all automix flags in the current region 24 are cleared to a value "0", at step SP107. Here, the "automix flags" are provided, in the current region 24, in corresponding relation to various data to be recorded as the automix data, each of which indicates whether or not the corresponding data has been updated in correspondence with the data stored in the current region 24 and recordable as automix data. Each of the automix flags is set to a value "1" when the corresponding data has been updated, but set to a value "0" when the corresponding data has not been updated. Then, once the user has located the current time at any desired time point at step SP108, the located-at position (time point) is recorded into the automix region 20. Further, the located-at position (time point) is also informed to the automix task 30 at step SP112. The user's locating operation is also informed as a locate command to the external equipment, and, in the external equipment having received the locate command, a locate process is performed to set the internal time code of the external equipment to the time point designated by the locate command. Conversely, when the mixing console has received a locate command from the external equipment, a similar locate process is performed to set the internal time code of the mixing console to the time point designated by the locate command.

Then, in the automix task 30, the informed located-at position is stored, and preparations are made for recording the automix data, at step SP114. Also, an internal counter of the timer 213 is reset to a predetermined initial counting value, at step SP116. Then, once the user has made various automix-related settings at step SP120, these settings are stored in the automix region 20 at step SP122. Examples of the settings to be made at step SP120 include selection of an absolute value/relative value of operation of the fader/encoder, a channel for which the user's operation is to be recorded, recording elements (elements to be recorded).

As the recorded elements, any of the following elements ①-⑦ may be selected:
① FADER: fader/recorder operation for each channel;
② CH ON: ON key operation for each channel;
③ PAN: panning operation for each channel;
④ EQ: equalizer operation for each channel;
⑤ SURROUND: sound image moving operation of surround panning;
⑥ library/scene recall operation; and
⑦ operation of peripheral equipment via a MIDI remote function (excluding MMC-compliant equipment)

Note that the operations of steps SP100, SP104, SP108 and SP120 above need not necessarily be carried out in the order as illustrated in FIG. 4 and the order may be modified as necessary. When the external equipment, such as a video tape recorder, sequencer or the like connected to the signal I/O section 212, is placed in condition to execute reproduction, an external time code generated by the external equipment is supplied to the time code task 12 at step S124, so that the supplied external time code is recorded by the time code task 12 into the current region 24 at step SP126. Because the external time code supplied from the external equipment starts incrementing with the current time set by the locate process and can be assumed to be the same type as the one selected at step SP100, they are stored in the current region 24 without being converted, and the time code displayed on the display 202 is updated by the panel processing task 8. Also, the timer 213 is activated with the time value of the supplied external time code as an initial counting value, at step SP128.

Once the timer 213 is activated, its internal counter starts counting a subsequent time at a "600 Hz" frequency. In this way, an internal time code of a "600" resolution is generated. The "600" resolution is the least common multiple of per-second resolution "30", "25" and "24" of various external time codes. Upon activation of the timer 213, a time interrupt signal is generated and given to the automix task 30 per three clock pulses of an internal clock, i.e. every 5 msec, at step SP134. Other operations will be described later. Different operations are carried out subsequently in accordance with events generated, as explained blow on an event-by-event basis.

2.1.2. User Operation Event:

Let it be assumed that the user then performs some operation on the electromotive fader unit 204 or operator unit 206. Such user's operation is detected by the panel processing task 8, at step SP130 of FIG. 5, so that the corresponding data in the current region 24 is updated on the basis of the contents of the detected user's operation at step Sp132. At that time, the automix flag corresponding to the updated data is set to the value "1".

Figure 5:
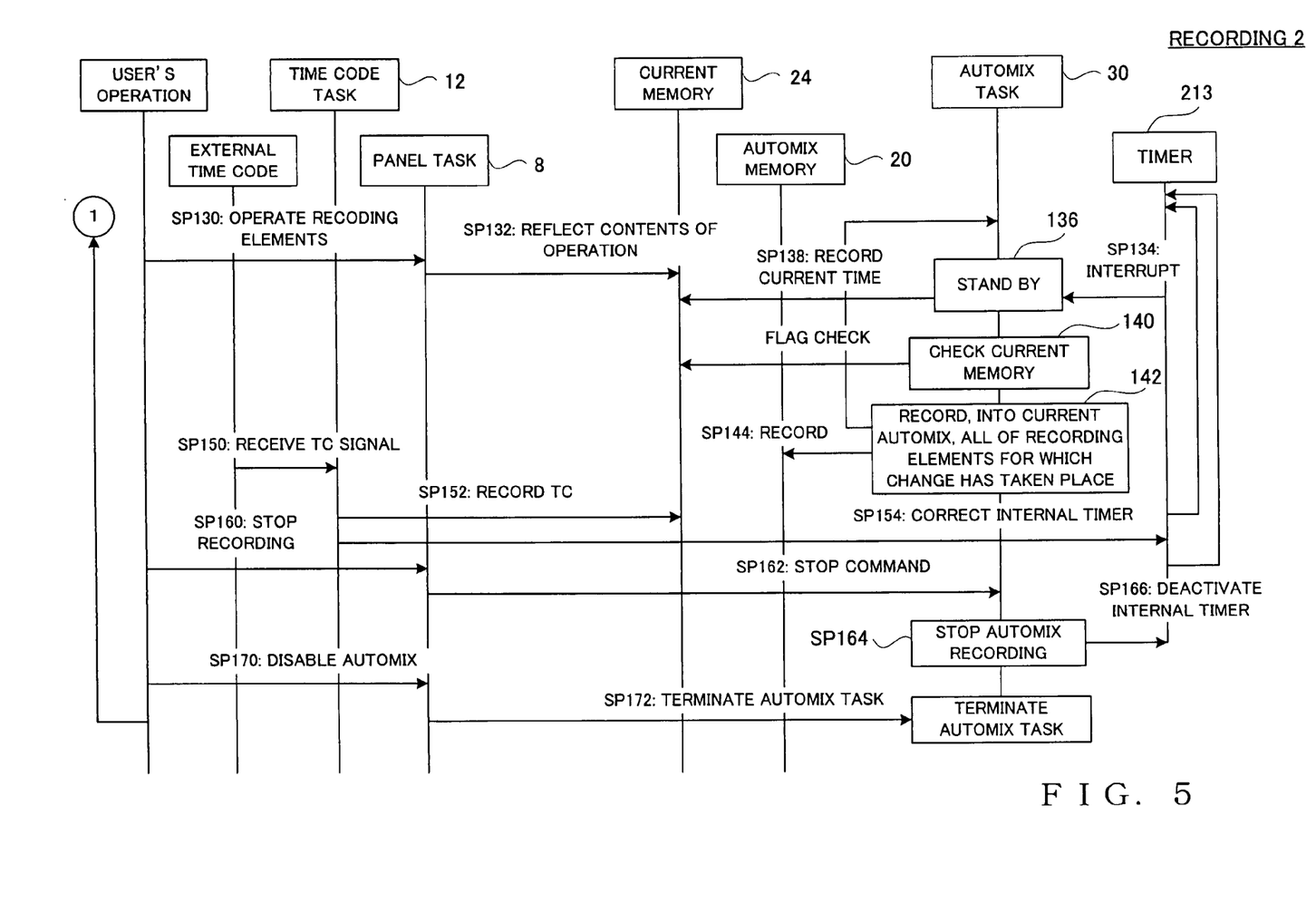
FIG. 5 is a flow chart showing a second portion of the recording processing performed in the embodiment of FIG. 1.

2.1.3. External Time Code Reception Event:

When a time code has been supplied from the external equipment, the supply of the external time code is detected by the time code task 12, at step SP150. Then, the external time code is recorded into a predetermined location of the current region 24, at step SP152. Then, at step SP154, the count (currently counted time value) of the timer 213 is corrected to coincide with the supplied external time code, so that an internal time code to be generated from that time on will be corrected accordingly. In the instant embodiment, the external time code comprises data indicative of the "hour", "minute", "second" and "frame number".

The "frame number" is set to a value "0" at the beginning of every second and sequentially incremented over a range from "0" to "P–1", if the resolution of the external time code is represented by "P". The count of the timer 213 is corrected in such a manner that a time value calculated by multiplying the frame number by "resolution of the internal time code/resolution of the external time code" is set as a count within the second. Assuming that the resolution is "30", a value calculated by multiplying the frame number by "600/30 (=20)" is set as a count within the second of the timer 213. Namely, because the frame number is changed incrementally with the resolution of the external time code, multiplying the frame number by a ratio, to the internal time code, of the external time code can effect conversion to an internal time code.

Upon completion of the above-described operations, the time code task 12 is kept in a standby state until an external time code is supplied again. Note that the external time code written in the current region 24 is read out by the panel processing task 8 as necessary and displayed on the display 202 along with the type of the external time code designated earlier at step SP100. Namely, the time code displayed on the display 202 is nothing but the external time code received by the time code task 12, not the count of the timer 213, and the resolution of the time code varies depending on the type of the external time code.

2.1.4. Timer Interrupt Event:

After completion of the automix-data recording preparations at step SP114, the automix task 30 is kept in a standby state until generation of a time interrupt event at step SP136. Once a time interrupt event occurs at step SP134, an internal time code is read out from the timer 213 and converted into a time code of the type selected by the user at step SP100. The thus-converted time code is written into the current region 24 at step SP138, and the time code displayed on the display 202 is converted by the panel processing task 8. Then, the processing proceeds to step SP140, where the automix flags in the current region 24 are checked so that each updated data is extracted from among the data pertaining to the recording elements. For each of the extracted recording elements, the automix flag is cleared to the value "0".

Then, the processing proceeds to step SP142, where the operation data of each of the updated recording elements and the time stamp corresponding to the current internal time code are recorded as event data into the automix region 20, at step SP144. In other words, the instant embodiment is characterized in that the internal time code output from the timer 213 is used as the time stamp in the event data. Namely, when the event data of the automix data is to be recorded in the instant embodiment, the internal time code having been converted in the above-described manner is used as the time stamp of the event data, without the external time code being used directly for recording. As a consequence, same automix data can be produced irrespective of the type of the external time code. Because the time resolution of the internal time code is higher than that of the external time code, the thus-produced automix data can be synchronized, with a high accuracy, to the external time code of any type. Because, in the instant embodiment, one interrupt event is generated at step SP134 every there clock pulses, a time code having one third of the resolution of the internal time code may be used as the time stamp of the automix data.

After that, the same operations as described above are carried out in response to generation of the respective events; that is, each time a user's operation event on the electric fader unit 204 or operator unit 206 is generated, the operations of steps SP130 to SP132 are carried out, each time an external time code reception event is generated, the operations of steps SP150 to SP154 are carried out, and each time a timer interrupt event (step SP134) is generated, the operations of steps SP136 to SP144 are carried out. As a consequence, automix data will be stored in the automix region 20 with contents of user's operation recorded as individual event data.

2.1.5. Recording Stop Operation Event:

Once the user operates a predetermined recording stop switch of the operator unit 206, this recording stop operation event is detected by the panel processing task 8 at step SP160, and a recording stop command is supplied to the automix task 30 at step SP162. Thus, the automix task 30 stops further recording into the automix region 20 at step SP164, and the timer 213 is also deactivated at step SP166. Then, once the user performs predetermined operation on the operator unit 206 to disable the automix function at step SP170, the automix task 30 is terminated at step SP172.

2.2. Reproducing Processing:

2.2.1. Start of Reproducing Processing:

Next, reproducing processing performed in the instant embodiment for reproducing automix data will be described, with reference to FIGS. 6 and 7.

Figure 6:
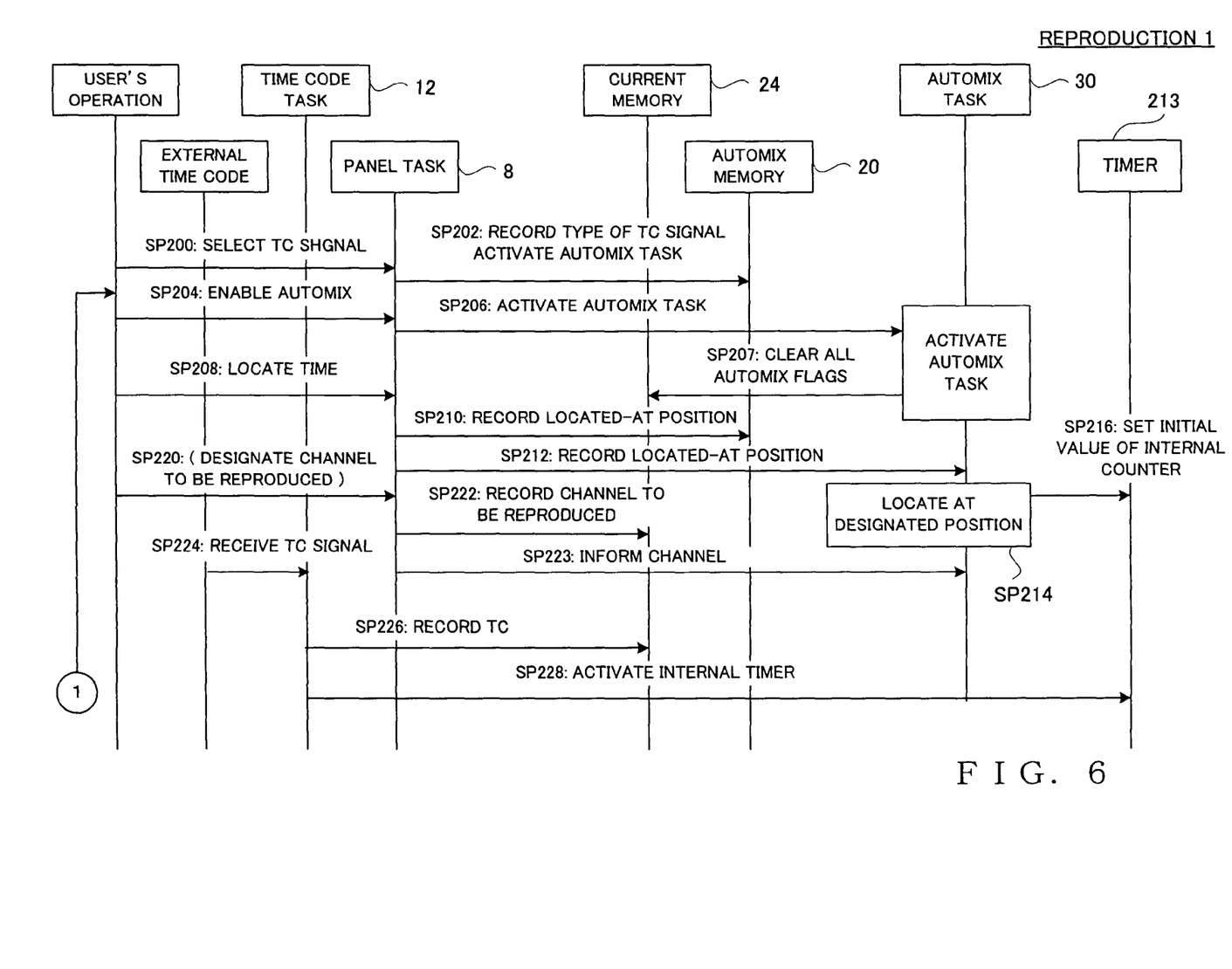
FIG. 6 is a flow chart showing a first portion of reproducing processing performed in the embodiment of FIG. 1.
Figure 7:
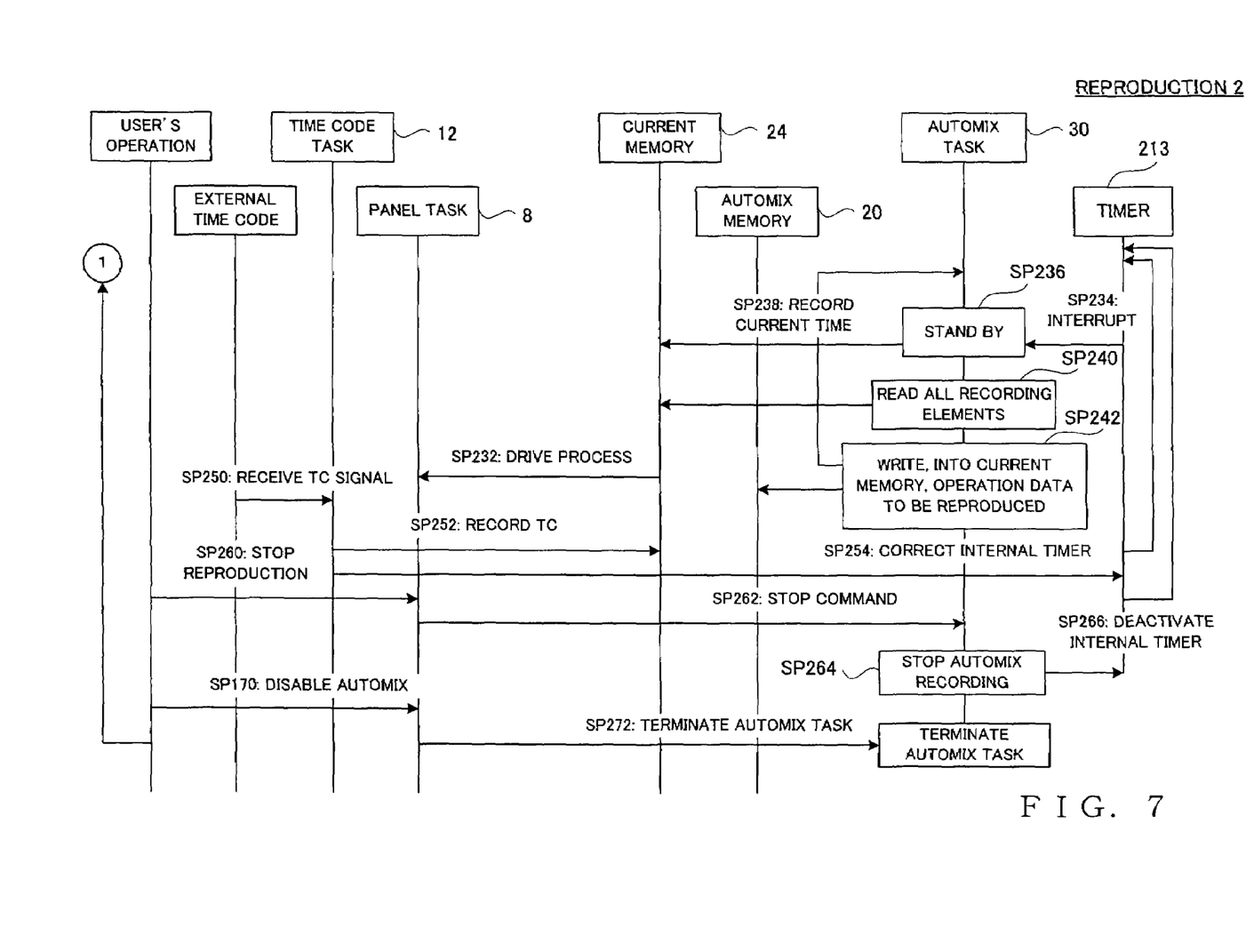
FIG. 7 is a flow chart showing a second portion of the reproducing processing performed in the embodiment of FIG. 1.

In FIG. 6, the user first selects a desired type of external time code via the operator unit 206 of the mixing console, at step SP200. The thus-selected type of external time code is written into a predetermined location of the automix region 20, at step SP202. Then, once the user enables the automix function via the operator unit 206 at step SP204, the panel processing task 8 performs an operation to activate the automix task 30 at step SP206. Note that if the automix region 20 has a plurality of sets of automix data stored therein, a selection is made at step SP204 as to which of the stored sets of automix data is to be reproduced.

Once the automix task 30 is activated, all the automix flags in the current region 24 are cleared to the value "0", at step SP207. Then, when the user has performed operation to locate the current time at a desired time point at step SP208, the user's operation is informed as a locate command to the external equipment, and the located-at position (time point) is recorded into the automix region 20 by the panel processing task 8. The located-at position (time point) is also informed to the automix task 30, at step SP212. These operations are similar to the above-described operations of steps SP100 to SP112 in the recording processing.

In the automix task 30, an operational state at the informed located-at position is reproduced (access is made to the beginning of the operational state at the informed located-at position) at step SP214, and the internal counter of the timer 213 is reset to its initial counting value at step SP216. Whereas the contents of all operation, designated as the "recording elements", are recorded as event data in the automix data, there may sometimes arise a need to reproduce only part of the recorded event data. For example, a situation may arise where fader operation amounts etc. for a portion of the input channels (96 input channels at the most) are automatically set on the basis of the automix data and fader operation amounts etc. for the other channels are manually set by the user in accordance with the circumstances.

Further, in a case where recording is to be performed on a large scale, for example, automix data may be generated while overwriting is performed a plurality of times. Thus, one or more channels to be reproduced from among the automix data are designated by the user as may be necessary (SP220), and the designated channels to be reproduced are written into the current region 24 at step SP222 and also informed to the automix task 30.

Note that the operations of steps SP200, SP204, SP208 and SP220 above need not necessarily be carried out in the order illustrated in the figure and the order may be modified as necessary. Once the video tape recorder, sequencer or the like has been placed in condition to execute reproduction, an external time code is supplied to the time code task 12 at step SP224 and the external time code is recorded into the current region 24 by the time code task 12 at step SP226, in the same manner as in the recording processing. Also, the timer 213 is activated to start counting with the time point represented by the external time code, at step SP228. In this way, the timer 213 starts counting a subsequent time at a "600 Hz" frequency to output an internal time code, in the same manner as in the recording processing. Operations corresponding to various events will be described below on an event-by-event basis.

2.2.2. External Time Code Reception Event:

When an external time code starting at a located-at position has been supplied from the external equipment, the supply of the external time code is detected by the time code task 12, at step SP250. Then, the external time code is recorded into a predetermined location of the current region 24, at step SP252. Then, at step SP254, the count (currently counted time value) of the timer 213 is corrected to coincide with the supplied external time code. These operations are also similar to the above-described operations of steps SP150 to SP154 in the recording processing.

2.2.3. Timer Interrupt Event:

After completion of the time locating operation at step SP214, the automix task 30 is kept in a standby state until generation of a time interrupt event, at step SP236. Once such a time interrupt event occurs at step SP234, an internal time code corresponding to the current time is read out from the timer 213 and written into the current region 24 at step SP238. Then, the processing proceeds to step SP240, where all the event data having the time stamp corresponding to the internal time code and previous time stamps are read out from the automix region 20.

Then, the processing proceeds to step SP242, where are extracted the operation data of the event data to be reproduced from among the read-out event data (if channels to be reproduced have been designated at step SP220, the event data of these channels to be reproduced). Then, the corresponding data in the current region 24 are updated on the basis of the extracted operation data, and such updating is informed to each related task. Thus, the stored contents of the current region 24 are read out by the related tasks as necessary.

For example, once the stored contents of the current region 24 are read out by the panel processing task 8, operations are performed for driving the electromotive fader unit 204 and updating the displayed contents on the display 202 in accordance with the read-out contents, at step SP232. Similarly, algorithms and parameters for arithmetic operations to be performed by the signal processing section 210 are controlled in accordance with the read-out contents of the current region 24. In this way, contents of user operation performed during the recording can be reproduced. Namely, in the instant embodiment, even when the event data of the automix data are to be reproduced, the external time code is not used directly in the reproduction, and the contents of user operation performed during the recording are reproduced on the basis of the counts of the timer 213. Thus, even if the type of the external time code has been changed at the time of the recording and reproduction, the contents of user operation performed during the recording can be reproduced accurately.

After that, each time a timer interrupt event is generated, the corresponding event data is read out from the automix region 20 and operation of the electromotive fader unit 204, operator unit 206, etc. is reproduced, in a similar manner to the above-described.

2.2.4. Reproducing Stop Operation Event:

Once the user operates a predetermined reproducing stop switch of the operator unit 206, this event is detected by the panel processing task 8 at step SP260, and a recording stop command is supplied to the automix task 30 at step SP262. Thus, the automix task 30 stops further reproduction at step SP264, and the timer 213 is also deactivated at step SP266. Then, once the user performs predetermined operation on the operator unit 206 to disable the automix function at step SP270, the automix task 30 is terminated at step SP272.

3. Modification

It should be appreciated that the present invention is not limited to the above-described embodiment alone and various modifications thereof are also possible as set forth below.

(1) Whereas, in the above-described embodiment, the event data included in the automix data each comprises a combination of operation data and a time stamp, the time stamp and operation data may be stored in the automix data separately from each other. With such alternative arrangements, one time stamp and a plurality of operation data can be associated with a plurality of operation events having occurred concurrently, so that the necessary memory capacity of the automix region 20 can be reduced.

(2) Further, whereas, in the above-described embodiment, the recording or reproducing processing is stopped by the user performing predetermined stopping operation (step SP160 or SP260), the recording or reproducing processing may stopped automatically when the supply of the external time codes has been stopped for a predetermined time period.

(3) Furthermore, although the resolution of the internal time code has been described above as "600" that is the least common multiple of the various resolution of the external time code, the resolution of the internal time code may be set at a suitable value, such as "100", that is not the least common multiple of the various resolution of the external time code. In such a case, if the resolution of the internal time code is represented by "Q", the resolution of the external time code is represented by "P" and the frame number of the external time code is represented by "R", there would occur time points at which "R·Q/P" does not assume an integral number. Because such time points are essentially points when no internal time code is generated, there may arise a case where the correction of the timer 213 becomes improper. Therefore, it is proper to correct the timer 213 only when "R·Q/P" duly assumes an integral number. Alternatively, even at time points when "R·Q/P" does not assume an integral number, the internal time code may be corrected using a value obtained by multiplying the frame number of the then-received external time code by "Q/P" and then dropping or rounding the decimal fraction of the multiplied result.

(4) Furthermore, whereas, in the above-described embodiment, the user is allowed to select any one of four types of external time code, "30", "30drop", "25" or "24", the present invention may of course be applied to cases where other types of external time code are used. For example, while the external time code has been described above as being the one used today primarily in video equipment, other forms of external time code may be used, such as an external time code in numerical value data as will be later described in modification (7).

(5) Furthermore, whereas the present invention has been described above as applied to a mixing console, it is also applicable to various apparatus for recording or reproducing operational states on the basis of an external time code.

(6) Furthermore, although the embodiment of the mixing console has been described as performing the automix processing using an external time code as a time reference, the mixing console of the present invention may be arranged to perform automix processing using another time reference than the external time code. In such a case, the timer 213 starts generating a free-running internal time code so that the automix processing is performed on the basis of the internal time code, in response to an automix recording or reproduction start instruction but irrespective of whether an external time code is supplied or not. Further, the free-running internal time code may be sent to external equipment as a time reference.

(7) Moreover, the internal time code of the "600 Hz" time resolution may be constructed in the same data format as the external time code, i.e. in the "hour", "minute", "second" plus "frame number" format, or in numerical value data X obtained by integrating the respective values of the "hour", "minute", "second" and "frame number" into a single numerical value (i.e., "frame number"+"second"*600+ "minute"*600*60+"hour"*600*60*60); in the case where the internal time code is constructed in the above-mentioned numerical value data X, the timer 213 may be a simple counter. In the case where the internal time code is constructed in the same format as the external time code, the conversion between the format of the internal time code and the format of the external time code is facilitated although the structure of the timer 213 has to be more or less complicated.

(8) Furthermore, whereas the embodiment has been described above as automatically setting the electromotive fader unit in accordance with operation data read out and reproduced from the memory, the recorded settings corresponding to the operation data may be reproduced via means that do not include any mechanically-moving member.

In summary, the present invention is characterized in that operation data is recorded/reproduced with a first time code of a higher time resolution than a second time code. Thus, the present invention can perform recording/reproducing processing on the operation data with enhanced synchronism. Further, according to the arrangement that the resolution of the first time code is a common multiple of a plurality of resolution of the second time code, the first time code can be readily corrected on the basis of the second time code. Furthermore, with the arrangement that the first time code is converted, in accordance with a designated type of second time code, into the second time code to update the current time code, a second time code of the designated type can be generated on the basis of the same first time code and displayed or output otherwise.

The present invention relates to the subject matter of Japanese Patent Application No. 2002-206777 filed on Jul. 16, 2002, the disclosure of which is expressly incorporated herein by reference in its entirety.

What is claimed is:

1. An apparatus for recording operation information synchronously with video or music reproduced by a reproduction device, said apparatus comprising:
   a timer that generates a first time code;
   an operator section that detects operation of one or more operator controls and generates operation data by indicative of the detected operation of each of said operator controls;
   a storage section;
   a control section that causes said storage section to store the operation data of each of said operator controls, generated by said operator section, along with said first time code generated by said timer as time information of the operation data;
   a reception section that recieves a second time code of the video or music reproduced by the reproduction device, said second time code being of lower resolution than said first time code; and
   a time code correction section that controls said timer, according to said second time code received by said reception section, to generator said first time code corrected on the basis of said second time code,
   wherein said time code correction section is capable of correcting said first time code in correspondence with any one of a plurality of types of second time code of different resolution, and
   wherein the resolution of said first time code is a common multiple of respective resolution of said plurality of types of second time code.

2. An apparatus as claimed in claim 1 which further comprises:
   a designation section that designates a type of second time code to be received by said reception means, from among a plurality of types of second time code of different resolution;
   a retention section that retains a second time code of the type, designated by said designation section, as a current time code;
   an updating section that converts said first time code, generated by said timer, into a third time code having the resolution of the designated type in accordance with the designated type and updates the current time code, retained by said retention section, with the third time code having the resolution of the designated type; and
   a display section that displays the current time code retained by said retention section.

3. An apparatus as claimed in claim 1 wherein said time code correction section converts a value of said second time code into a value having the resolution of said first time code, in accordance with a ratio between the resolution of said first time code and the resolution of said second time code, and then sets the converted value in said timer as said first time code.

4. An apparatus for reproducing operation information synchronously with video or music reproduced by a reproduction device, said apparatus comprising:
   a timer that generates a first time code;
   a storage section that stores operation data, indicative of an operation of at least one operator control, along with time information indicative of a reproducing timing when the operation data is to be reproduced;
   a control section that reads out, from said storage section, the operation data for which the reproducing timing has arrived, in accordance with a progression of said first time code generated by said timer, and outputs the operation data;
   a reception section that receives a second time code of the video or music reproduced by the reproduction device, said second time code being of lower resolution than said first time code; and
   a time code correction section that controls said timer, according to said second time code received by said reception section, to generates said first time code corrected on the basis of said second time code;
   wherein said control section reads out, from said storage section, each operation data when the time information of the operation data coincide with the corrected first time code, in accordance with a progression of the corrected first time code so that the operation data is reproduced from said storage section synchronously with the video or music reproduced by the reproduction device,
   wherein said time code correction section is capable of correcting said first time code in correspondence with any one of a plurality of types of second time code of different resolution, and
   wherein the resolution of said first time code is a common multiple of respective resolution of said plurality of types of second time code.

5. An apparatus as claimed in claim 4 which further comprises an operator section that includes one or more operator controls, a position of each of said operator controls being capable of being automatically set, and
   wherein, when given operation data is read out from said storage section by said control section, a corresponding one of said operator controls in said operator section is automatically set to a position in accordance with the read-out operation data.

6. An apparatus as claimed in claim 4 which further comprises:
   a designation section that designates a type of second time code to be received by said reception means, from among a plurality of types of second time code of different resolution;
   a retention section that retains a third time code of the type, designated by said designation section, as a current time code;
   an updating section that converts said first time code, generated by said timer, into a third time code having the resolution of the designated type in accordance with the designated type and updates the current time code, retained by said retention section, with the third time code having the resolution of the designated, type; and a display section that displays the current time code retained by said retention section.

7. An apparatus as claimed in claim 4 wherein said time code correction section converts a value of said second time code into a value having the resolution of said first time code, in accordance with a ratio between the resolution of said first time code and the resolution of said second time code, and then sets the converted value in said timer as said first time code.

8. A time code generating apparatus comprising:
   a timer section that generates a first time code in accordance with passage of time;
   a designation section that designates a type of time code from among a plurality of types of time code of different resolution;
   a retention section that retains, as a current time code, a time code varying over time with a resolution of the type designated by said designation section; and
   an updating section that converts said first time code, generated by said timer section, into a second time code having the resolution of the designated type in accordance with the designated type and updates the current time code, retained by said retention section, with the second time code having the resolution of the designated type,
   wherein the current time code retained by said retention section is outputted, and
   wherein a time resolution of said first time code is a common multiple of respective time resolution of said plurality of types of time code.

9. A time code generating apparatus as claimed in claim 8 which further comprises a display section that displays the current time code outputted by said retention section.

10. A method for recording operation information, indicative of operation on an operator unit detecting operations of one or more operator controls, into a memory synchronously with video or music reproduced by a reproduction device, said method comprising:
    a step of generating a first time code sequentially varying over time;
    a step of generating operation data indicative of the detected operation of each of said operator controls on said operator unit;
    a step of, in response to generation of the operation data by said step of generating operation data, causing said memory to store the generated operation data along with said first time code as time information of the operation data;
    a step of receiving a second time code of the video or music reproduced by the reproduction device, said second time code being of lower resolution than said first time code; and
    a step controlling generation of said first time code by said step of generating a first time code, according to said second time code received by said step of receiving, to generate said first time code corrected on the basis of said second time code,
    wherein said step of controlling generation of said first time code corrects said first time code in correspondence with any one of a plurality of types of second time code of different resolution, and
    wherein the resolution of said first time code is a common multiple of respective resolution of said plurality of types of second time code.

11. A method for reproducing operation information of at least one operator control from a memory synchronously with video or music reproduced by a reproduction device, said memory storing operation data, indicative of an operation of said at least one operator control, along with time information indicative of a reproducing timing when the operation data is to be reproduced, said method comprising:
    a step of generating a first time code sequentially varying over time;
    a step of reading out, from said memory, given operation data for which the reproducing timing has arrived, in accordance with a progression of said first time code, and outputting the operation data;
    a step of receiving a second time code of the video or music reproduced by the reproduction device, said second time code being of lower resolution than said first time code; and
    a step of controlling generation of said first time code by said step of generating a first time code, according to said second time code received by said step of receiving, to generate said first time code corrected on the basis of said second time code;
    wherein said step of reading out reads out, from said memory, each operation data when the time information of the operation data coincides with the corrected first time code, in accordance with a progression of the corrected first time code so that the operation data is reproduced from said memory synchronously with the video or music reproduced by the reproduction device,
    wherein step of controlling generation of said first time code corrects said first time code in correspondence with any one of a plurality of types of second time code of different resolution, and
    wherein the resolution of said first time code is a common multiple of respective resolution of said plurality of types of second time code.

12. A method as claimed in claim 11 wherein respective positions of one or more operator controls are capable of being automatically set, and
    which further comprises a step of, when given operation data is read out from said memory, automatically setting a corresponding one of said operator controls to a position in accordance with the read-out operation data.

13. A method for generating a time code of a designated time resolution, said method comprising:
    a step of generating a first time code of a predetermined time resolution in accordance with passage of time;
    a step of designating a type of time code from among a plurality of types of time code of different time resolution;
    a step of converting said first time code, generated by said step of generating, into a second time code having a time resolution of the designated type of time code; and
    a step of retaining said second time code having the time resolution of the designated type in a register as a current value of the time code having the time resolution of the designated type, whereby the current value of the time code retained in the register is sequentially updated with said second time code having the time resolution of the designated type,
    wherein the time code having the designated time resolution is retained in the register,
    wherein a time resolution of said first time code is a common multiple of respective time resolution of said plurality of types of time code.

14. A computer-readable medium encoded with a computer program for causing a computer to perform a method for recording operation information, indicative of operation on an operator unit detecting operation of one or more operator controls, into a memory synchronously with video or music reproduced by a reproduction device, said method comprising:

a step of generating a first time code sequentially varying over time;

a step of generating operation data indicative of the detected operations of each of said operator controls on said operator unit;

a step of, in response to generation of the operation data by said step of generating operation data, causing said memory to store the generated operation data along with said first time code as time information of the operator data;

a step of receiving a second time code of the video or music reproduced by the reproduction device, said second time code being of lower resolution than said first time code; and     a step of controlling generation of said first time code by said step of generating a first time code, according to said second time code received by said step of receiving, to generate said first time code corrected on the basis of said second time code,     wherein said step of controlling generation of said first time code corrects said first time code in correspondence with any one of a plurality of types of second time code of different resolution, and     wherein the resolution of said first time code is a common multiple of respective resolution of said plurality of types of second time code.

15. A computer-readable medium encoded with a computer program for causing a computer to perform a method for reproducing operation information of at least one operator control from a memory synchronously with video or music reproduced by a reproduction device, said memory storing operation data, indicative of an operation of said at least one operator control, along with time information indicative of a reproducing timing when the operation data is to be reproduced, said method comprising:

a step of generating a first time code sequentially varying over time;

a step of reading out, from said memory, given operation data for which the reproducing timing has arrived, in accordance with a progression of said first time code, and outputting the operation data;

a step of receiving a second time code of the video or music reproduced by the reproduction device, said second time code being of lower resolution than said first time code; and     a step of controlling generation of said first time code by said step of generating a first time code, according to said second time code received by said step of receiving, to generate said first time code corrected on the basis of said second time code;

wherein said step of reading out reads out, from said memory, each operation data when the time information of the operation data coincides with the corrected first time code, in accordance with a progression of the corrected first time code so that the operation data is reproduced from said memory synchronously with the video or music reproduced by the reproduction device,     wherein step of controlling generation of said first time code corrects said first time code in correspondence with any one of a plurality of types of second time code of different resolution, and     wherein the resolution of said first time code is a common multiple of respective resolution of said plurality of types of second time code.

16. A computer-readable medium as claimed in claim 15 wherein respective positions of the one or more operator controls are capable of being automatically set, and     which further comprises a step of, when operation data is read out from said memory, automatically setting a corresponding one of said operator controls to a position in accordance with the read-out operation data.

17. A computer-readable medium encoded with a computer program for causing a computer to perform a method for generating a time code of a designated time resolution, said method comprising:

a step of generating a first time code of a predetermined time resolution in accordance with passage of time;

a step of designating a type of time code from among a plurality of types of time code of different time resolution;

a step of converting said first time code, generated by said step of generating, into a second time code having a time resolution of the designated type of time code; and     a step of retaining said second time code having the time resolution of the designated type in a register as a current value of the time code of the time resolution of the designated type, whereby the current value of the time code retained in the register is sequentially updated with said second time code having the time resolution of the designated type,     wherein the time code of the designated time resolution is retained in the register, and     wherein a time resolution of said first time code is a common multiple of respective time resolution of said plurality of types of time code.

\* \* \* \* \*